United States Patent
Lee et al.

(10) Patent No.: US 8,227,006 B2
(45) Date of Patent: *Jul. 24, 2012

(54) USE OF ERYTHRITOL AND D-TAGATOSE IN DIET OR REDUCED-CALORIE BEVERAGES AND FOOD PRODUCTS

(75) Inventors: Thomas Lee, Scarsdale, NY (US); Gino Olcese, Scarsdale, NY (US); Zena Bell, Hartsdale, NY (US); Glenn Roy, Beacon, NY (US); William Mutilangi, Croton on Hudson, NY (US); Rein Hirs, Mahopac, NY (US); Peter Given, Ridgefield, CT (US)

(73) Assignee: Pepsico, Inc., Purchase, NY (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/621,304

(22) Filed: Jan. 9, 2007

(65) Prior Publication Data

US 2007/0110868 A1    May 17, 2007

Related U.S. Application Data

(63) Continuation of application No. 10/127,473, filed on Apr. 23, 2002, now abandoned.

(60) Provisional application No. 60/287,215, filed on Apr. 27, 2001.

(51) Int. Cl.
*A23L 1/236* (2006.01)

(52) U.S. Cl. ......... 426/548; 426/477; 426/569; 426/590

(58) Field of Classification Search .................. 426/474, 426/477, 548, 569, 590
See application file for complete search history.

(56) References Cited

U.S. PATENT DOCUMENTS

| 4,902,525 A | * | 2/1990 | Kondou | ......................... | 426/548 |
| 4,956,191 A | | 9/1990 | Ueda et al. | | |
| 5,912,030 A | * | 6/1999 | Huzinec et al. | ................... | 426/3 |
| 6,066,345 A | * | 5/2000 | de Cock | ........................ | 426/106 |

FOREIGN PATENT DOCUMENTS

| JP | 44-029301 | 12/1969 |
| JP | 10-136953 | 5/1998 |
| WO | 99-34689 | 7/1999 |
| WO | 00/42865 | 7/2000 |

OTHER PUBLICATIONS

Office Action received for corresponding Japanese Patent Application 2007-246827 dated Feb. 15, 2011.
CN Office Action dated Sep. 26, 2011, corresponding Application 201010289668.4; English Translation.

* cited by examiner

*Primary Examiner* — Leslie Wong
(74) *Attorney, Agent, or Firm* — Banner & Witcoff, Ltd.

(57) ABSTRACT

A combination of a sugar alcohol and D-tagatose is used to produce naturally sweetened, diet beverages or food products. The sugar alcohol and D-tagatose can also be used in combination with one or more nutritive sweeteners to lower the calories of a full-calorie beverage or food product while preserving the taste.

13 Claims, No Drawings

USE OF ERYTHRITOL AND D-TAGATOSE IN DIET OR REDUCED-CALORIE BEVERAGES AND FOOD PRODUCTS

This application is a continuation of U.S. patent application Ser. No. 10/127,473, filed Apr. 23, 2002, which claims the benefit of U.S. Provisional Application No. 60/287,215, filed Apr. 27, 2001. These applications are incorporated herein by reference in their entirety.

BACKGROUND OF THE INVENTION

1. Field of the Invention

This invention relates to the use of a combination of a sugar alcohol and D-tagatose in a variety of diet or reduced calorie beverages and food products. This invention particularly relates to naturally sweetened, zero- and low-calorie beverages and food products sweetened only with a sugar alcohol and D-tagatose, as well as to methods of making the same. The invention also relates to reduced-calorie beverages and food products, sweetened with a sugar alcohol, D-tagatose and at least one nutritive sweetener, which taste similar to naturally sweetened, full-calorie beverages and food products. The invention also relates to methods of making such reduced-calorie beverages and food products.

2. Related Background Art

Zero- or low-calorie beverages and food products are very popular. Such diet products typically contain, singularly or in blends, non-nutritive sweeteners such as aspartame, acesulfame-K, saccharin, sucralose and cyclamate. While consumers do not have to worry about calories with such diet products, some consumers would prefer a naturally sweetened, zero- and low-calorie beverage or food product. However, there are no naturally occurring, intense sweeteners approved for use in the United States. It is, therefore, difficult to formulate good tasting, naturally sweetened diet or reduced-calorie beverages or food products.

Sorbitol and mannitol are examples of naturally occurring, low intensity, low-calorie sweeteners. The simple use of sorbitol or mannitol to make low-calorie sweetened beverages or food products would result in products which have a different quality of sweetness than full-calorie, naturally sweetened products, not to mention certain gastrointestinal issues. Likewise, partial substitution of such a low-intensity natural sweetener would produce reduced-calorie products lacking in certain respects as compared with naturally sweetened, full-calorie counterparts. All of these products may not be sweet enough, may have off-tastes or may have incompatibilities with certain flavors. Hence, there is a need for good quality, naturally sweetened, diet or reduced-calorie beverages and food products.

SUMMARY OF THE INVENTION

This invention is directed to a diet beverage sweetened only with a sugar alcohol and D-tagatose.

This invention is also directed to diet or reduced-calorie beverages sweetened with a sugar alcohol, D-tagatose and at least one nutritive sweetener. In certain preferred embodiments, the at least one nutritive sweetener is selected from fructose, sucrose, dextrose, maltose, trehalose, rhamnose, corn syrups and fructo-oligosaccharides.

In preferred embodiments of the present invention, erythritol is employed in an amount of about 0.1% to about 3.5% based on finished beverage weight and D-tagatose is employed in an amount of about 0.1% to about 1.0% based on finished beverage weight.

The diet or reduced-calorie beverages of the present invention can be selected from soft drinks, fountain beverages, frozen ready-to-drink beverages, coffee beverages, tea beverages, powdered soft drinks, liquid concentrates, flavored waters, enhanced waters, fruit juice and fruit juice flavored drinks, sport drinks and alcoholic drinks. The diet or reduced-calorie food products of the present invention can be selected from confections, dairy products, gelatins, puddings, cake mixes, cereals or cereal-based products or baked goods.

The present invention is further directed to methods of making diet or reduced-calorie beverages and food products which comprise including in a beverage or a food product a sugar alcohol, D-tagatose and, optionally, at least one nutritive sweetener.

The invention is also directed to a sweetener composition comprising a sugar alcohol, D-tagatose and, optionally, at least one nutritive sweetener.

DETAILED DESCRIPTION

The present inventors have discovered that by blending two natural low-intensity sweeteners, namely a sugar alcohol such as erythritol and D-tagatose, a sweetener composition which imparts a sugar-like sweetness is attained. Further, there is no aftertaste in beverages or food products sweetened with the combination of sugar alcohol and D-tagatose, and there are no known problems with flavor compatibility. Hence, such a combination of sugar alcohol and D-tagatose can be used alone to provide sweetness in zero- or low-calorie beverages or foods or can be used in combination with at least one nutritive sweetener to reduce the caloric content of full-calorie beverages or foods, while maintaining the taste of full-calorie products.

As used herein, "taste" refers to a combination of sweetness perception, temporal effects of sweetness perception, i.e., on-set and duration, off-tastes, e.g., bitterness and metallic taste, residual perception (aftertaste) and tactile perception, e.g., body and thickness. As used herein, "zero-calorie" means having less than 5 calories per serving, e.g., per 8 oz. for beverages. As used herein, "low-calorie" means having less than or equal to 40 calories per serving, e.g., per 8 oz. for beverages. As used herein, "diet" refers to either "zero-calorie" or "low-calorie". What is more, "reduced calorie" means having a reduced number of calories as compared with a full-calorie counterpart; more particularly, "reduced calorie" typically means having at least a 25% reduction in calories per serving, e.g., per 8 oz. for beverages.

According to the first embodiment of the present invention, a diet or reduced-calorie beverage is sweetened with (a) a sugar alcohol and (b) D-tagatose. According to a second embodiment, a diet or reduced-calorie beverage is sweetened with (a) a sugar alcohol, (b) D-tagatose and (c) at least one nutritive sweetener.

Beverages include, without limitation, carbonated soft drinks, fountain beverages, frozen ready-to-drink beverages, coffee beverages, tea beverages, powdered soft drinks, as well as liquid concentrates, flavored waters, enhanced waters, fruit juice and fruit juice flavored drinks, sport drinks and alcoholic products. The beverage may be carbonated or noncarbonated. In a preferred embodiment of the present invention, the beverage is a flavored water, an enhanced water, a carbonated cola-flavored soft drink or a frozen carbonated beverage (FCB).

Sugar alcohols suitable for use in the present invention include, without limitation, sorbitol, mannitol, lactitol, maltitol, xylitol, erythritol and combinations thereof. Typically, the sugar alcohol is included in an amount from about 0.1% to 3.5% of the finished beverage by weight. Erythritol, i.e., meso-erythritol, is especially preferred for use in the present invention. Typically, erythritol is included in an amount from about 0.1% to 3.5% of the finished beverage, preferably from about 0.2% to 2.5% of the finished beverage. Erythritol can be obtained from Cerestar (Hammond, Ind.) and is reported to generate almost no calories (0.2 calorie/g).

D-tagatose is included in an amount from about 0.1% to 1.0% of the finished beverage by weight, preferably 0.2% to 0.9% of the finished beverage by weight, and most preferably 0.3% to 0.6% of the finished beverage by weight. D-tagatose can be obtained from Arla Foods (Union, N.J.) and is reported to impart about 1.5 calories/g.

Any nutritive sweetener is suitable for use; as used herein, a "nutritive" sweetener is one which provides significant caloric content in typical usage amounts, i.e., more than about 1 calorie per serving (8 oz. for beverages). Suitable nutritive sweeteners include, without limitation, fructose, sucrose, dextrose, maltose, trehalose, rhamnose, corn syrups and fructo-oligosaccharides. One of ordinary skill in this art will readily appreciate that nutritive sweeteners may be combined in various ratios to form a nutritive sweetener blend suitable for use in the present invention. Precise ratios of nutritive sweeteners depend on the combination of sweeteners used in a given blend and the desired overall sweetness for a given application. Appropriate ratios can be readily determined by one of ordinary skill in this art.

One of ordinary skill in this art will also readily appreciate that the amount of the nutritive sweetener or blend of nutritive sweeteners in a finished beverage will vary depending on a variety of factors such as the desired overall sweetness for a given application. Appropriate amounts can be readily determined by one of ordinary skill in this art.

The combination of sugar alcohol and D-tagatose can be readily used to substitute a portion of the nutritive sweetener in a full-calorie beverage without losing sweetness or taste. This is an unexpected advantage of the reduced-calorie beverages of the present invention.

Further embodiments of the present invention are directed to diet or reduced-calorie food products sweetened with a combination of (a) a sugar alcohol, (b) D-tagatose and, optionally, (c) at least one nutritive sweetener. Such food products include, without limitation, confections, dairy products, gelatins, puddings, cake mixes, cereals and cereal-based products and baked goods. All of the above discussion related to the inclusion of a sugar alcohol, D-tagatose and at least one nutritive sweetener in a diet or reduced-calorie beverage is applicable to diet or reduced-calorie food products.

Another embodiment of the present invention is directed to methods of making diet or reduced-calorie beverages and food products which comprise sweetening beverages or food products with a combination of (a) a sugar alcohol, (b) D-tagatose and, optionally, (c) at least one nutritive sweetener.

Another embodiment of the present invention is directed to a sweetener composition comprising (a) a sugar alcohol, (b) D-tagatose and, optionally, (c) at least one nutritive sweetener as set forth above.

It is possible to include any other ingredients typically used in beverages and food products in appropriate amounts in the diet or reduced-calorie beverages and food products of the present invention. One of ordinary skill in the art would be capable of determining appropriate usage levels. Such ingredients include, without limitation, flavors, colors, preservatives, acidulants, buffering salts, caffeine, anti-foam agents and foaming agents.

The examples which follow are intended as an illustration of certain preferred embodiments of the invention, and no limitation of the invention is implied.

EXAMPLE 1

Erythritol (3% or 30 g per 1 L) and D-tagatose (0.9% or 9 g per 1 L) were dissolved in 0.9 L Aquafina® water. Sodium citrate (0.113 g) and citric acid (0.13 g) were added to the solution. Additional water was added to make 1 L finished beverage. A good tasting, naturally sweetened, low-calorie water was obtained.

EXAMPLE 2

Erythritol (3% or 30 g per 1 L) and D-tagatose (0.9% or 9 g per 1 L) were dissolved in 0.9 L Aquafina® water. Sodium citrate (0.113 g), citric acid (0.13 g) and 0.2% fruit flavor (based on finished beverage weight) were added to the solution. Additional water was added to make 1 L finished beverage. A good tasting, naturally sweetened, low-calorie, fruit flavored water was obtained.

EXAMPLE 3

Erythritol (3% or 30 g per 1 L) and D-tagatose (0.9% or 9 g per 1 L) were dissolved in 0.9 L Aquafina® water. Sodium citrate (0.113 g), citric acid (0.13 g), 0.2% fruit flavor (based on finished beverage weight) and fructose (0.29% or 2.9 g per 1 L) were added to the solution. Additional water was added to make 1 L finished beverage. A good tasting, naturally sweetened, low-calorie (10 calories per 8 oz.), fruit flavored sport drink was obtained. The level of sweetness of the drink was the same or more than that of a sport drink made with only high fructose corn syrup (35 calories per 8 oz.).

EXAMPLE 4

Forty percent of the high fructose corn syrup of an 11 Brix cola beverage was replaced with a 2% erythritol/0.9% D-tagatose blend. A reduced-calorie, naturally sweetened cola beverage having the same sweetness and taste as its full-calorie counterpart was obtained.

EXAMPLE 5

Erythritol (3% or 30 g per 1 L) and D-tagatose (0.9% or 9 g per 1 L) were dissolved in 0.9 L Aquafina® water. Sodium citrate (0.113 g), citric acid (0.13 g), 0.2% fruit flavor (based on finished beverage weight), vitamin B complex (10% recommended daily value based on finished beverage) and fructose (0.29% or 2.9 g per 1 L) were added to the solution. Additional water was added to make 1 L finished beverage. A good tasting, naturally sweetened, low-calorie (10 calories per 8 oz.), fruit flavored sport drink was obtained. The level of sweetness of the drink was the same or more than that of a sport drink made with only high fructose corn syrup (35 calories per 8 oz.).

EXAMPLE 6

To a gallon of unsweetened Diet Mountain Dew® base, erythritol (2% by weight of finished drink) and D-tagatose (0.9% by weight of finished drink) were added, and the solution was stirred until complete dissolution occurred. Fructose (3.6% based on weight of finished drink) was then added, and again the solution was stirred until complete dissolution. The syrup thus prepared was placed into a frozen carbonated beverage machine (Cornelius, V3, Wisconsin) in a 1 plus 5 throw (1 part syrup with 5 parts carbonated water). The resulting naturally sweetened, low-calorie FCB has good carbon dioxide overrun, smooth, creamy mouthfeel and great taste. In addition, the syrup can be successively run through the FCB machine to consistently achieve a high quality FCB.

Other variations and modifications of this invention will be obvious to those skilled in this art. This invention is not to be limited except as set forth in the following claims.

What is claimed is:

1. A diet beverage comprising (a) erythritol and (b) D-tagatose; wherein the erythritol is present in an amount of 0.1% to about 3.5% based on finished diet beverage weight and the D-tagatose is present in an amount of about 0.1% to about 1.0% based on finished diet beverage weight, wherein the diet beverage contains 40 calories or less per 8 oz serving.

2. The diet beverage according to claim 1, wherein the erythritol is present in an amount of about 0.2% to about 2.5% based on finished diet beverage weight.

3. The diet beverage according to claim 1, wherein the D-tagatose is present in an amount of about 0.2% to about 0.9% based on finished diet beverage weight.

4. The diet beverage according to claim 3, wherein the D-tagatose is present in an amount of about 0.3% to about 0.6% based on finished diet beverage weight.

5. The diet beverage according to claim 1, wherein said beverage is selected from the group consisting of soft drinks, fountain beverages, frozen ready-to-drink beverages, coffee beverages, tea beverages, powdered soft drinks, liquid concentrates, flavored waters, enhanced waters, fruit juice and fruit juice flavored drinks, sport drinks and alcoholic drinks.

6. The diet beverage according to claim 5, wherein the diet beverage is a cola soft drink or a frozen carbonated beverage.

7. The diet beverage according to claim 1 further comprising at least one nutritive sweetener.

8. The diet beverage according to claim 7, wherein the at least one nutritive sweetener is selected from the group consisting of fructose, sucrose, dextrose, maltose, trehalose, rhamnose, corn syrups and fructo-oligosaccharides.

9. A reduced-calorie beverage comprising (a) erythritol, (b) D-tagatose and (c) at least one nutritive sweetener; wherein the erythritol is present in an amount of 0.1% to about 3.5% based on finished diet beverage weight and the D-tagatose is present in an amount of about 0.1% to about 1.0% based on finished diet beverage weight, wherein the reduced-calorie beverage contains at least 25% fewer calories per 8 oz serving compared to a full-calorie counterpart.

10. A reduced-calorie cola soft drink comprising (a) erythritol, (b) D-tagatose and (c) at least one nutritive sweetener; wherein the erythritol is present in an amount of 0.1% to about 3.5% based on finished diet beverage weight and the D-tagatose is present in an amount of about 0.1% to about 1.0% based on finished diet beverage weight, wherein the reduced-calorie beverage contains at least 25% fewer calories per 8 oz serving compared to a full-calorie counterpart.

11. The reduced-calorie cola soft drink according to claim 10, wherein the at least one nutritive sweetener is fructose.

12. A reduced-calorie frozen carbonated beverage comprising (a) erythritol, (b) D-tagatose and (c) at least one nutritive sweetener; wherein the erythritol is present in an amount of 0.1% to about 3.5% based on finished diet beverage weight and the D-tagatose is present in an amount of about 0.1% to about 1.0% based on finished diet beverage weight, wherein the reduced-calorie beverage contains at least 25% fewer calories per 8 oz serving compared to a full-calorie counterpart.

13. The reduced-calorie frozen carbonated beverage according to claim 12, wherein the at least one nutritive sweetener is fructose.

* * * * *